US012748567B2

(12) United States Patent
Kanevsky et al.

(10) Patent No.: US 12,748,567 B2
(45) Date of Patent: Sep. 29, 2026

(54) ENHANCED COMPUTING DEVICE REPRESENTATION OF AUDIO

(71) Applicant: Google LLC, Mountain View, CA (US)

(72) Inventors: Dimitri Kanevsky, Mountain View, CA (US); Sagar Savla, Mountain View, CA (US); Ausmus Chang, Taipei City (TW); Chiawei Liu, Taipei City (TW); Daniel P W Ellis, New York, NY (US); Jinho Kim, Napa, CA (US); Justin Stuart Paul, San Francisco, CA (US); Sharlene Yuan, Orange, CA (US); Alex Huang, Taipei City (TW); Yun Che Chung, Taipei City (TW); Chelsey Fleming, West Hollywood, CA (US)

(73) Assignee: Google LLC, Mountain View, CA (US)

( * ) Notice: Subject to any disclaimer, the term of this patent is extended or adjusted under 35 U.S.C. 154(b) by 609 days.

(21) Appl. No.: 18/044,831

(22) PCT Filed: Aug. 31, 2021

(86) PCT No.: PCT/US2021/048496
§ 371 (c)(1),
(2) Date: Mar. 10, 2023

(87) PCT Pub. No.: WO2022/076108
PCT Pub. Date: Apr. 14, 2022

(65) Prior Publication Data

US 2023/0342108 A1 Oct. 26, 2023

Related U.S. Application Data

(60) Provisional application No. 63/088,811, filed on Oct. 7, 2020.

(51) Int. Cl.
*G06F 3/16* (2006.01)
*G10L 25/51* (2013.01)
*G10L 25/72* (2013.01)

(52) U.S. Cl.
CPC .............. *G06F 3/167* (2013.01); *G10L 25/51* (2013.01); *G10L 25/72* (2013.01)

(58) Field of Classification Search
CPC ........................................................ G06F 3/167
(Continued)

(56) References Cited

U.S. PATENT DOCUMENTS 6,731,307 B1 * 5/2004 Strubbe ................ H04N 21/466 715/764
6,795,808 B1 * 9/2004 Strubbe ................ H04N 21/466 704/E15.04
(Continued)

FOREIGN PATENT DOCUMENTS

CN 102088911 A 6/2011
CN 103793515 A 5/2014
(Continued)

OTHER PUBLICATIONS

Alertus Technologies LLC. et al., "Mass Notification for the Deaf and Hard of Hearing", Sep. 18, 2020, 5 pp.
(Continued)

*Primary Examiner* — Reza Nabi
(74) *Attorney, Agent, or Firm* — Shumaker & Sieffert, P.A.

(57) ABSTRACT

An example method includes receiving, by one or more processors of a computing device, audio data recorded by one or more microphones of the computing device; and generating, based on the audio data and by the one or more processors, one or more structured sound records, a first structured sound record of the one or more structured sound
(Continued)

records including: a description of a first sound, the description including a descriptive label of the first sound, the descriptive label different than a text transcription of the first sound, and a time stamp indicating a time at which the first sound occurred; and outputting a graphical user interface including a timeline representation of the one or more structured sound records.

24 Claims, 12 Drawing Sheets

(58) Field of Classification Search
USPC ........... 715/727; 704/231; 709/206; 381/320
See application file for complete search history.

(56) References Cited

U.S. PATENT DOCUMENTS

| | | | | |
|---|---|---|---|---|
| 7,058,889 | B2 * | 6/2006 | Trovato | H04N 21/43079 715/721 |
| 8,457,959 | B2 * | 6/2013 | Kaiser | G09B 19/04 704/231 |
| 9,967,684 | B2 | 5/2018 | Ingemarsson et al. | |
| 10,269,228 | B2 | 4/2019 | Aarts | |
| 10,395,494 | B2 | 8/2019 | Nongpiur et al. | |
| 2003/0046421 | A1 * | 3/2003 | Horvitz | H04L 51/226 709/206 |
| 2014/0095166 | A1 | 4/2014 | Bell et al. | |
| 2016/0379666 | A1 * | 12/2016 | Christian | G10L 25/27 704/276 |
| 2017/0196026 | A1 * | 7/2017 | Daoud | H04W 4/16 |
| 2019/0259378 | A1 * | 8/2019 | Khadloya | G06F 9/542 |
| 2019/0362022 | A1 | 11/2019 | Haukioja et al. | |
| 2020/0160985 | A1 * | 5/2020 | Kusuma | G16H 30/40 |
| 2021/0012770 | A1 * | 1/2021 | Choudhary | G06F 3/017 |
| 2021/0076966 | A1 * | 3/2021 | Grantcharov | G06N 20/00 |
| 2022/0027417 | A1 * | 1/2022 | Katz | G06F 16/90335 |
| 2023/0082528 | A1 * | 3/2023 | Croghan | H04R 25/604 381/320 |

FOREIGN PATENT DOCUMENTS

| | | | |
|---|---|---|---|
| CN | 111048114 | A | 4/2020 |
| EP | 1850321 | A1 | 10/2007 |
| EP | 3703361 | A1 | 9/2020 |
| JP | 2018097239 | A | 6/2018 |
| WO | 2017062047 | A1 | 4/2017 |

OTHER PUBLICATIONS

International Search Report and Written Opinion of International Application No. PCT/US2021/048496 dated Jan. 5, 2022, 13 pp.
Jain et al., "Exploring Sound Awareness in the Home for People who are Deaf or Hard of Hearing", CHI 2019, Glasgow, Scotland UK, May 4, 2019, 11 pp.
Varshney, "Can Google Live Transcribe Actually Solve Your Transcription Woes?", YOURSTORY, Sep. 6, 2019, 6 pp.
Worthy, "Verbatim Transcription: Meaning and when it's Needed", GMR Transcription Services, Inc., Mar. 25, 2019, 4 pp.
Response to Communication pursuant to Article 94(3) EPC dated Mar. 12, 2025, from counterpart European Application No. 21773993.7 filed Jun. 30, 2025, 4 pp.
Response to Communication Pursuant to Rules 161(1) and 162 EPC dated Apr. 20, 2023, from counterpart European Application No. 21773993.7, filed Oct. 4, 2023, 5 pp.
Communication pursuant to Article 94(3) EPC from counterpart European Application No. 21773993.7 dated Mar. 12, 2025, 8 pp.
Office Action from counterpart Japanese Application No. 2023-521411 dated Sep. 9, 2025, 6 pp.
Office Action from counterpart Korean Application No. 10-2023-7010080 dated Sep. 29, 2025, 14 pp.
Response to Office Action dated Sep. 29, 2025, from counterpart Korean Application No. 10-2023-7010080 filed Jan. 26, 2026, 46 pp.
First Office Action and Search Report from counterpart Chinese Application No. 202180066234.4 dated May 10, 2026, 19 pp. Translation Attached.
First Examination Report from counterpart Indian Application No. 202347017765 dated Jun. 18, 2026, 9 pp.
Jain et al., "HomeSound: An Iterative Field Deployment of an In-Home Sound Awareness System for Deaf or Hard of Hearing Users", CHI '20: CHI Conference on Human Factors in Computing Systems, Apr. 2020, 25 pp.
Kemler, "New features to make audio more accessible on your phone", blog.google /products-and-platforms/platforms/android/new-features-make-audio-more-accessible-your-phone/, May 15, 2019, 3 pp.
Rossignol, "iOS 14 Can Notify Users About Sounds Like Fire Alarms and Doorbells", www.macrumors.com/2020/06/23/ios-14-sound-recognition-alarms-doorbells/, Jun. 23, 2020, 7 pp.
Decision of Rejection, and translation thereof, from counterpart Korean Application No. 10-2023-7010080 dated Jul. 20, 2026, 8 pp.

* cited by examiner

ENHANCED COMPUTING DEVICE REPRESENTATION OF AUDIO

This application is a 371 Application of PCT Application No. PCT/US2021/048496 filed Aug. 31, 2021 which claims the benefit of U.S. Provisional Patent Application No. 63/088,811, filed Oct. 7, 2020, the entire contents of which is incorporated herein by reference.

BACKGROUND

People who are deaf and/or hard of hearing (DHH) may have difficulty with hearing or understanding various sounds. For instance, people who are DHH may have difficulty gaining knowledge about environmental sounds, particularly if they are not wearing hearing assistive devices (e.g., hearing aids, cochlear implants, etc.).

SUMMARY

In general, this disclosure is directed to techniques for representing sounds detected by computing devices. For instance, a computing device may generate structured sound records based on recorded audio data. A structured sound record may include a description of a sound and a time stamp indicating a time at which the sound occurred. The description may include a descriptive label of the sound or a text transcription of the sound. For instance, where the sound includes spoken words, the description may include a text transcription of the spoken words. Similarly, where the sound corresponds to a pre-determined sound, the descriptive label may include a classification of the pre-determined sound. The descriptive labels may be divided into various categories, such as emergency category labels, priority category labels, and other category labels. In some examples, the computing device may utilize artificial intelligence, such as a machine learning model, to determine a label for a sound.

The computing device may use the structured sound records to generate various outputs. For instance, the computing device may output a non-audio indication of one or more structured sound records. The non-audio indication may take the form of one or more output modalities including graphical, haptic, and light. As one illustrative example, where a computing device generates a structured sound record with a descriptive label in the emergency category (e.g., a smoke alarm), the computing device may output a haptic alert and/or strobe to alert a user who, due to being DHH, may not otherwise be aware of the smoke alarm. This may be particularly useful if the user is at a location with smoke alarms that do not include strobes.

In some examples, the computing device may cause one or more other computing devices to adjust operation based on the structured sound records generated by the computing device. For instance, the computing device may cause another computing device associated with a user of the computing device (e.g., a wearable device) to output a non-audio indication. To continue with the previous example, responsive to generating a structured audio record with a descriptive label in the emergency category, a computing device associated with a user (e.g., a mobile phone) may output a message to a wearable computing device associated with the user (e.g., a smart watch) that causes the wearable computing device to output a non-audio indication (e.g., to output a haptic alert).

In some examples, the computing device may output a graphical user interface (GUI) including a timeline representation of one or more structured sound records. The timeline representation may assist a user in further interpreting sounds. For instance, by viewing a timeline representation, a user may determine potential causation of events. As one example, where a timeline indicates that a door knock occurred at a first time, a baby crying occurred at a second time after the first time, and a dog barked at a third time after the second time, the user may determine that the door knock potentially caused the baby to cry.

As discussed above, in some examples, the structured sound records may include a description that includes a text transcription. The computing device may output graphical user interfaces (GUIs) that include text transcriptions in a manner that improves a user's understanding. For instance, the computing device may output a timeline view that includes the text transcriptions. In some examples, the timeline view may be shared across multiple computing devices. For instance, a first computing device may output a representation of one or more structured sound records to a second computing device. Both the first and second computing devices may output timeline views, which may be independently scrolled. As such, the timeline views output by the computing devices may cover a same time period, or may cover different time periods.

As one example, a method includes receiving, by one or more processors of a computing device, audio data recorded by one or more microphones of the computing device; generating, based on the audio data and by the one or more processors, one or more structured sound records, a first structured sound record of the one or more structured sound records including: a description of a first sound, the description including a descriptive label of the first sound, the descriptive label different than a text transcription of the first sound, and a time stamp indicating a time at which the first sound occurred; and outputting a graphical user interface including a timeline representation of the one or more structured sound records.

As another example, a computing device includes one or more microphones; and one or more processors configured to receive audio data recorded by the one or more microphones of the computing device; generate, based on the audio data and by the one or more processors, one or more structured sound records, a first structured sound record of the one or more structured sound records including: a description of a first sound, the description including a descriptive label of the first sound, the descriptive label different than a text transcription of the first sound, and a time stamp indicating a time at which the first sound occurred; and output a graphical user interface including a timeline representation of the one or more structured sound records.

As another example, a computer-readable storage medium stores instructions that, when executed, cause one or more processors of a computing device to receive audio data recorded by one or more microphones of the computing device; generate, based on the audio data and by the one or more processors, one or more structured sound records, a first structured sound record of the one or more structured sound records including: a description of a first sound, the description including a descriptive label of the first sound, the descriptive label different than a text transcription of the first sound, and a time stamp indicating a time at which the first sound occurred; and output a graphical user interface including a timeline representation of the one or more structured sound records.

The details of one or more examples of the disclosure are set forth in the accompanying drawings and the description below. Other features, objects, and advantages will be apparent from the description and drawings, and from the claims.

DETAILED DESCRIPTION

Figure 1:
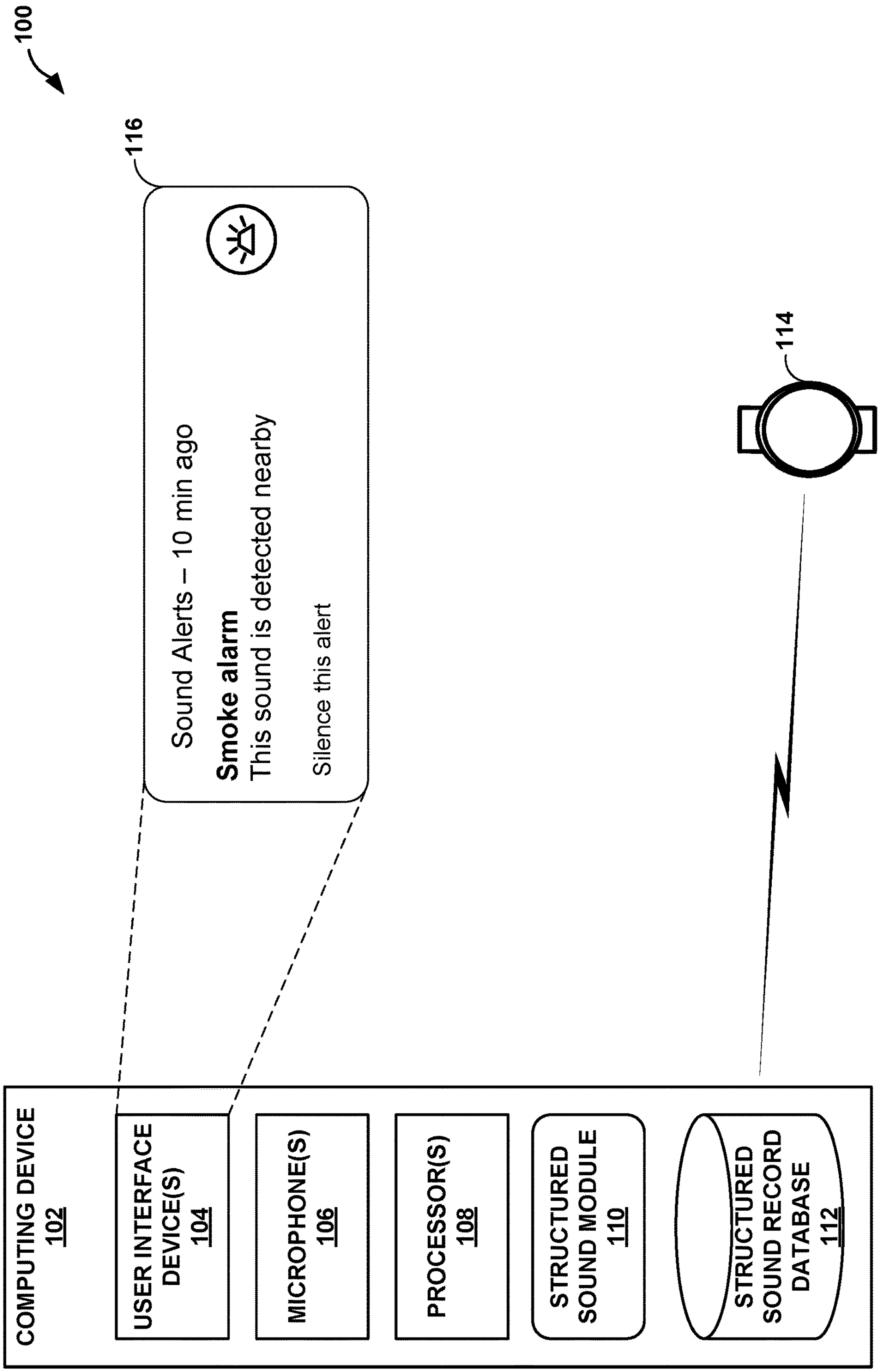
FIG. 1 is a system diagram illustrating a system that includes a computing device configured to generate structured sound records, in accordance with one or more techniques of this disclosure.

FIG. 1 is a system diagram illustrating a system that includes a computing device configured to generate structured sound records, in accordance with one or more techniques of this disclosure. As shown in FIG. 1, system 100 may include computing device 102 and other computing device 114.

Examples of computing device 102 may include, but are not limited to, a mobile phone (including a so-called "smartphone"), smart glasses, a smart watch, a portable speaker (including a portable smart speaker), a laptop computer, a portable gaming system, a wireless gaming system controller, a wireless headphone charging case, a smart home device (e.g., a smart thermostat, a smart smoke detector, etc.), an ambient computing device (including a so-called "smart display"), and the like. As shown in FIG. 1, computing device 102 may include user interface device(s) 104, microphone(s) 106, processor(s) 108, structured sound module 110, and structured sound record database 112.

As shown in FIG. 1, computing device 102 includes user interface device 104. User interface device 104 may function as an input and/or output device for computing device 102. User interface device 104 may be implemented using various technologies. For instance, user interface device 104 may function as an input device using presence-sensitive input screens, infrared sensor technologies, or other input device technology for use in receiving user input. User interface device 104 may function as an output device configured to present output to a user using any one or more display devices, speaker technologies, haptic feedback technologies, or other output device technology for use in outputting information to a user. User interface device 104 may be used by computing device 102 to output, for display, a graphical user interface (GUI), such as user interface 116.

Microphone(s) 106 may generate electrical signals based on soundwaves. One or more of microphones 106 may be integrated into computing device 102. In some examples, one or more of microphones 106 may be external to computing device 102 and connected to computing device 102 via a wired or wireless interface.

Processor(s) 108 may implement functionality and/or execute instructions within computing device 102. Examples of processors 108 include, but are not limited to, a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

In accordance with one or more techniques of this disclosure, computing device 102 may include structured sound module 110, which may be configured to generate structured sound records based on observed sounds. For instance, processors 108 may execute structured sound module 110 to process audio data recorded by microphones 106 to generate structured sound records. Structured sound module 110 may store the generated structured sound records in structured sound record database 112.

Each structured sound record may include one or more fields. Example fields include, but are not limited to, a description field, and a timestamp field. In some examples, the description field in a structured sound record may include a descriptive label of a sound in the audio data from which the structured sound record was generated. As discussed in further detail below, the descriptive labels may be selected from a pre-determined set of descriptive labels that includes emergency category labels, priority category labels, and/or other category labels.

In some examples, the description field may include a text transcription of spoken words included in the audio data from which the structured sound record was generated. In other examples, text transcriptions may be included in a different field (e.g., other than the description field) of the structured sound record (e.g., and the description field may indicate that the structured sound record includes a text transcription).

In some examples, such as where a structured sound record includes a text transcription, the structured sound record may include a field that characterizes the text transcription. For example, the structured sound record may include a field that indicates an emotional characteristic that accompanies the text transcription (e.g., sad, happy, and angry).

In some examples, all of the processing to generate the structured sound records may occur "on-device." For instance, computing device 102 may generate the structured sound records without the audio data ever leaving computing device 102. In this way, the techniques of this disclosure may enhance privacy.

Structured sound module 110 may generate non-audio output based on the generated structured sound records. For instance, structured sound module 110 may cause one or more devices of user interface devices 104 to output a non-audio indication of one or more structured sound records. As one example, structured sound module 110 may cause a display of user interface devices 104 to display a GUI, such as GUI 116, that includes a graphical indication of one or more structured sound records. As shown in FIG. 1, the graphical indication of one or more structured sound records may include a notification indicating that a structured sound record of a particular type has been generated. Other output modalities may be used in addition to, or in place of, the graphical indication. As one example, structured sound module 110 may cause a haptic device of user interface devices 104 to output a haptic signal (e.g., to vibrate or shake) responsive to a structured sound record of a particular type being generated. As another example, structured sound module 110 may cause a light device (e.g., a strobe or camera flash) of user interface devices 104 to output a light signal responsive to a structured sound record of a particular type being generated. In this way, structured sound module 110 may select one or more of haptic outputs, graphical outputs, and/or light outputs as the non-audio indication of the one or more structured sound records.

A user may interact with the graphical indication of one or more structured sound records in a variety of ways. For instance, a user may interact with the graphical notification of GUI 116 by selecting (e.g., tapping) on the graphical notification. In response to receiving user input selecting the graphical indication, computing device 102 may display a timeline view, as discussed in further detail below with reference to FIGS. 4A and 4B.

As discussed above, computing device 102 may both generate the structured sound records and provide non-audio user output based on the structured sound records. In some examples, computing device 102 may cause one or more other (i.e., different) computing devices, such as other computing device 114, to provide non-audio user output based on the structured sound records. Computing device 102 may cause the other computing device to provide output in addition to, or in place of, non-audio user output provided by computing device 102.

While illustrated in FIG. 1 as a wearable computing device, other computing device 114 is not so limited. Examples of other computing device 114 may include, but are not limited to, a mobile phone (including a so-called "smartphone"), smart glasses, a smart watch, a portable speaker (including a portable smart speaker), a laptop computer, a portable gaming system, a wireless gaming system controller, a wireless headphone charging case, a smart home device (e.g., a smart thermostat, a smart smoke detector, etc.), an ambient computing device (including a so-called "smart display"), and the like Computing device 102 may communicate with other computing device 114, and any additional other computing devices, via direct or indirect links. Some examples of direct links include, but are not limited to, Bluetooth connections, Bluetooth Low-Energy (LE) connections, Wi-Fi Direct connections, wired connections, and the like. Some examples of indirect links include, but are not limited to, the Internet, local networks such as ethernet or Wi-Fi networks, and the like.

As discussed above, when generating a structured sound record, structured sound module 110 may select a descriptive label from a pre-determined set of descriptive labels. For instance, structured sound module 110 may monitor an incoming stream of audio data generated by microphones 106 to determine if a sound in the audio data matches a sound associated with a descriptive label in the pre-determined set of descriptive labels. As discussed in further detail below, in some examples, structured sound module 110 may use artificial intelligence and/or machine learning (AI/ML) to determine if a sound in the audio data matches a sound associated with a descriptive label in the pre-determined set of descriptive labels. Responsive to determining that a particular sound in the audio data matches a sound associated with a particular descriptive label in the pre-determined set of descriptive labels, structured sound module 110 may generate a new structured sound record for the particular sound with a description of the particular descriptive label and a time stamp indicating a time at which the particular sound occurred. Structured sound module 110 may store the newly generated structured sound record in a structured sound record database. As discussed herein, structured sound module 110 may generate non-audio user output in response to generating the new structured sound record.

The pre-determined set of descriptive labels may include emergency category labels, priority category labels, and other category labels. Emergency category labels may include one or more of a smoke alarm label, a fire alarm label, a carbon monoxide label, a siren label, and a shouting label. Priority category labels may include one or more of a baby crying label, a doorbell label, a door knocking label, an animal alerting label, and a glass breaking label. Other category labels may include one or more of a water running label, a landline phone ringing label, and one or more appliance beep labels.

As discussed above, structured sound module 110 may select from different output modalities when outputting a non-audio indication of a structured sound record. In some examples, structured sound module 110 may select different modalities for different descriptive labels. As one example, structured sound module 110 may select the output modality for a non-audio indication of a particular structured sound record based on a category of a descriptive label of the particular structured sound record (e.g., such that non-audio indications are output using common modalities for all descriptive labels in a particular category). As another example, structured sound module 110 may select the output modality for a non-audio indication of a particular structured sound record based on a descriptive label of the particular structured sound record (e.g., such that non-audio indications may be output using different modalities, even for descriptive labels in a particular category).

Figure 2:
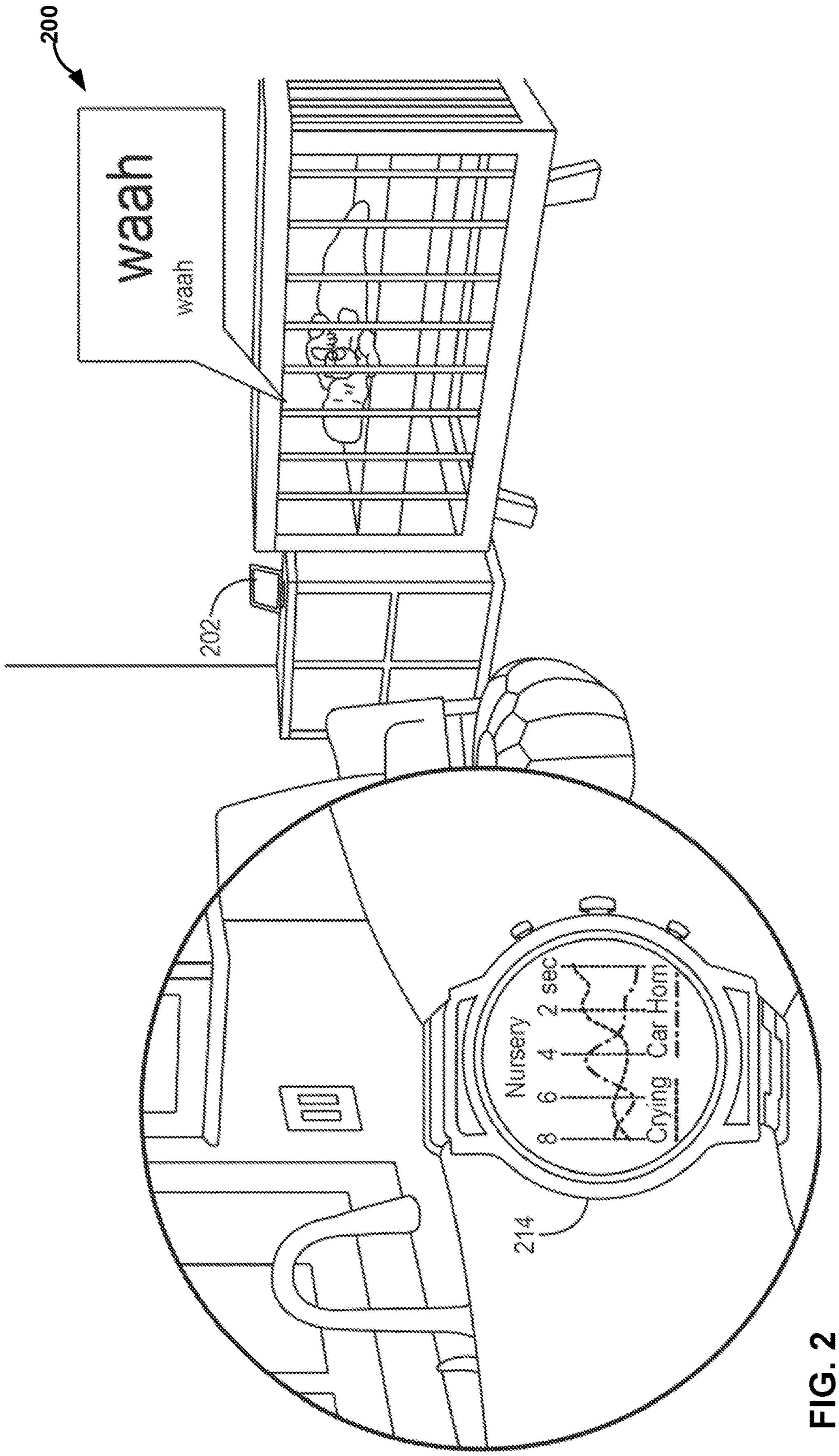
FIG. 2 is a conceptual diagram illustrating a system that includes a first computing device configured to cause a second computing device to output a non-audio indication of a structured sound record generated at the first computing device, in accordance with one or more techniques of this disclosure.

FIG. 2 is a conceptual diagram illustrating a system that includes a first computing device configured to cause a second computing device to output a non-audio indication of a structured sound record generated at the first computing device, in accordance with one or more techniques of this disclosure. As shown in FIG. 2, first computing device 202 of system 200 may be an ambient computing device positioned in a baby's room (e.g., a nursery). First computing device 202 may be considered to be an example of computing device 102 of FIG. 1. While illustrated as including a display, in some examples, first computing device 202 may not include a display (e.g., where first computing device 202 is a smoke detector, camera, speaker, etc.). As shown in the example of FIG. 2, second computing device 214 of system 200 may be a wearable computing device worn by a caregiver of the baby sleeping in the baby's room. Second computing device 214 may be considered to be an example of other computing device 114 of FIG. 1.

In operation, one or more microphones of first computing device 202 may generate audio data representing sounds in the baby's room. A structured sound module (e.g., similar to structured sound module 110 of FIG. 1) may generate one or more structured sound records based on the generated audio data. As one example, where a car horn is honked outside, the sound of the horn may travel into the baby's room and be picked up by the microphones of first computing device 202. The structured sound module of first computing device 202 may recognize the sound as a car horn and generate a structured sound record with a descriptive label of "car horn" and a time stamp at which the car horn sound occurred. Some sounds may last more than an instant. As such, in some examples, such as the example of FIG. 2, first computing device 202 may generate structured sound records to indicate a length of a sound occurrence and may additionally indicate an amplitude (e.g., a level) of the sound throughout the sound occurrence.

First computing device 202 may determine whether to output an indication of the structured sound record to one or more other computing devices, such as second computing device 214. In the example of FIG. 2, the "car horn" descriptive label may not be associated with an output modality of an external device. As such, first computing device 202 may not, on its own, cause second computing device 214 to output a non-audio indication responsive to first computing device 202 generating the structured sound record with the descriptive label of "car horn." However, in some examples, second computing device 214 may be used as a monitor. As such, second computing device 214 (e.g., responsive to receiving user input requesting as such) may output a request to first computing device 202 to provide recently generated structured audio records (e.g., structured audio records generated by first computing device 202 in the last 10 minutes, 5 minutes, 1 minute, 30 seconds, 10 seconds, 5 seconds, etc.).

As can be expected, in actuality, some sounds may induce the occurrence of other sounds. For instance, a car horn honking in proximity to a room with a sleeping baby may induce a sound of crying. Such a pattern can be seen in the example of FIG. 2. For instance, the car horn may wake the baby, who may begin crying. Said crying may be represented in audio data generated by microphones of first computing device 202, and the structured sound module of first computing device 202 may recognize the crying sound in the audio data and generate a structured sound record with the descriptive label "baby crying."

First computing device 202 may determine whether to output an indication of the structured sound record to one or more other computing devices, such as second computing device 214. In the example of FIG. 2, the "baby crying" descriptive label may be associated with an output modality of generating an alert (e.g., graphical and haptic) at an external device. As such, first computing device 202 may cause second computing device 214 to output a non-audio indication responsive to first computing device 202 generating the structured sound record with the descriptive label of "baby crying."

As shown in the example of FIG. 2, second computing device 214 may display a graphical user interface (GUI) that includes a non-audio indication of the structured sound records. For instance, second computing device 214 may display a graph with a vertical axis representing amplitude (e.g., volume) and a horizontal axis representing time, with plots for each structured sound record (e.g., a first plot illustrating an amplitude to time relationship for "car horn" and a second plot illustrating an amplitude to time relationship for "baby crying"). In this way, not only may second computing device 214 alert the caregiver that the baby is awake and crying, but may further enable the caregiver, who may be DHH, to determine a cause for the baby awakening.

Figure 3:
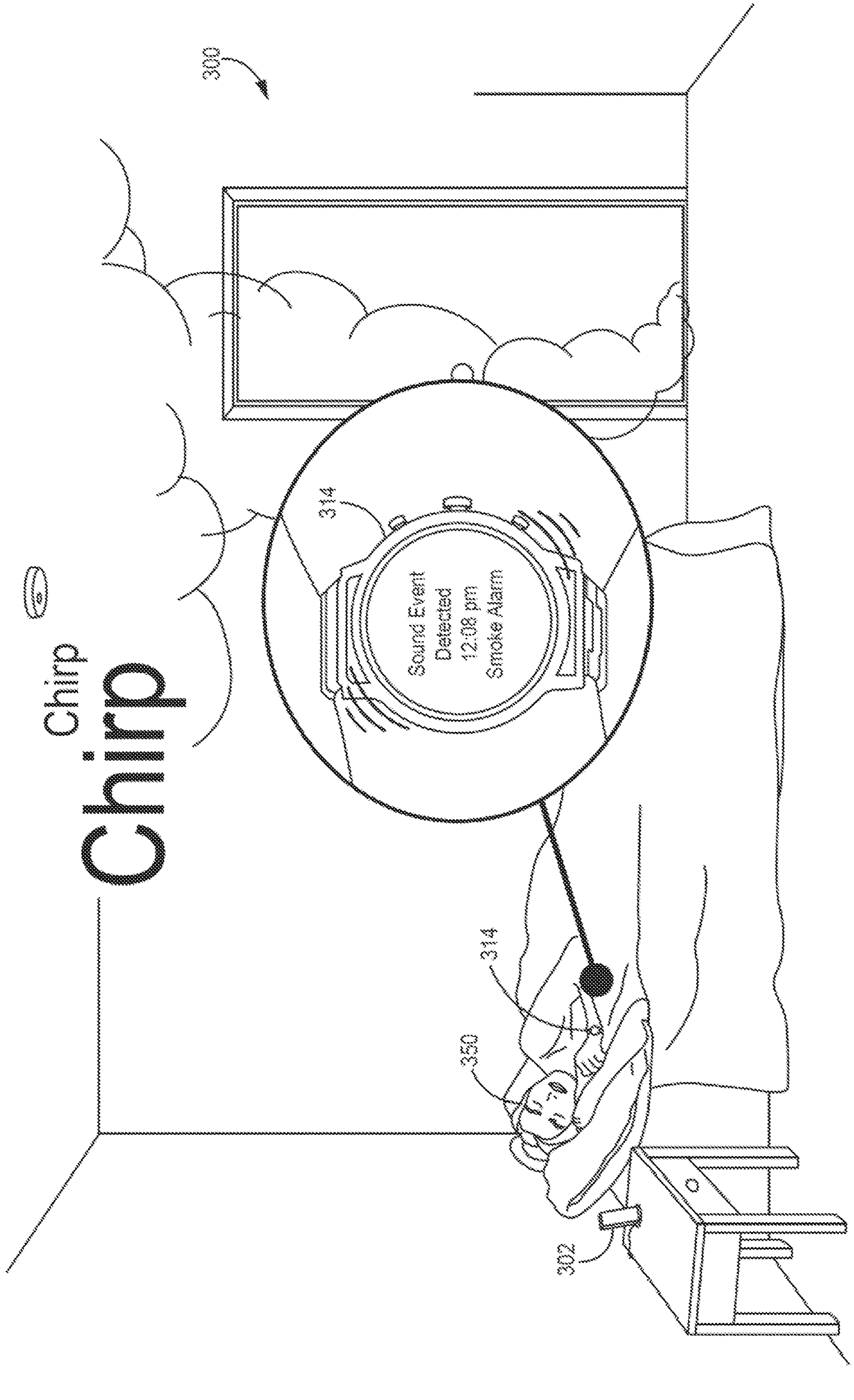
FIG. 3 is a conceptual diagram illustrating a system that includes a first computing device configured to cause a second computing device to output a non-audio indication of a structured sound record generated at the first computing device, in accordance with one or more techniques of this disclosure.

FIG. 3 is a conceptual diagram illustrating a system that includes a first computing device configured to cause a second computing device to output a non-audio indication of a structured sound record generated at the first computing device, in accordance with one or more techniques of this disclosure. As shown in FIG. 3, first computing device 302 of system 300 may be a mobile computing device of a user, such as user 350. First computing device 302 may be considered to be an example of computing device 102 of FIG. 1. As shown in the example of FIG. 3, second computing device 314 of system 300 may be a wearable computing device worn by a user, such as user 350 (e.g., first computing device 302 and second computing device 314 may be used by a common user). Second computing device 314 may be considered to be an example of other computing device 114 of FIG. 1.

In operation, one or more microphones of first computing device 302 may generate audio data representing sounds in the room in which first computing device 302 is positioned (e.g., the room in which user 350 is sleeping). A structured sound module (e.g., similar to structured sound module 110 of FIG. 1) may generate one or more structured sound records based on the generated audio data. As one example, where a smoke detector begins chirping (e.g., in response to detecting smoke), the chirps may be picked up by the microphones of first computing device 302. The structured sound module of first computing device 302 may recognize the sound as a smoke alarm and generate a structured sound record with a descriptive label of "smoke alarm" and a time stamp at which the chirps occurred.

First computing device 302 may determine whether to output an indication of the structured sound record to one or more other computing devices, such as second computing device 314. In the example of FIG. 3, the "smoke alarm" descriptive label may be associated with an output modality of an external device. For instance, descriptive label "smoke alarm" may be an emergency category label and, at least in the example of FIG. 2, generation of a structured sound record with an emergency category label may trigger output of non-audio indications using every possible output modality. As such, potentially in addition to outputting one or more non-audio indications using output devices of first computing device (e.g., haptic, graphical, and light), first computing device 302 may cause second computing device 314 to output a non-audio indication responsive to first computing device 302 generating the structured sound record with the descriptive label of "smoke alarm." As shown in the example of FIG. 2, first computing device 302 may cause second computing device 302 to output a haptic indication and a graphical indication of the structured sound record with the descriptive label of "smoke alarm." In this way, system 300 may more effectively make user 350 aware of an emergency (e.g., a smoke alarm). These techniques may be particularly useful where user 350 is in a location that does not feature DHH emergency awareness devices (e.g., smoke alarms with built-in strobes, pillow/bed shakers, etc.).

In some examples, computing devices may share indications of generation of certain structured sound records with computing devices of other users. For instance, a computing device of a user, such as computing device 302 of user 350, may output an alert to other computing devices in response to generating the structured sound record with the label "smoke alarm." The other computing devices may be associated with other users in a certain geographical area (e.g., a radius from or geo-fence around computing device 302). In some examples, computing device 302 may register as a provider and/or subscribe as a recipient of such alerts (e.g., via a server system or other service).

Figure 4A:
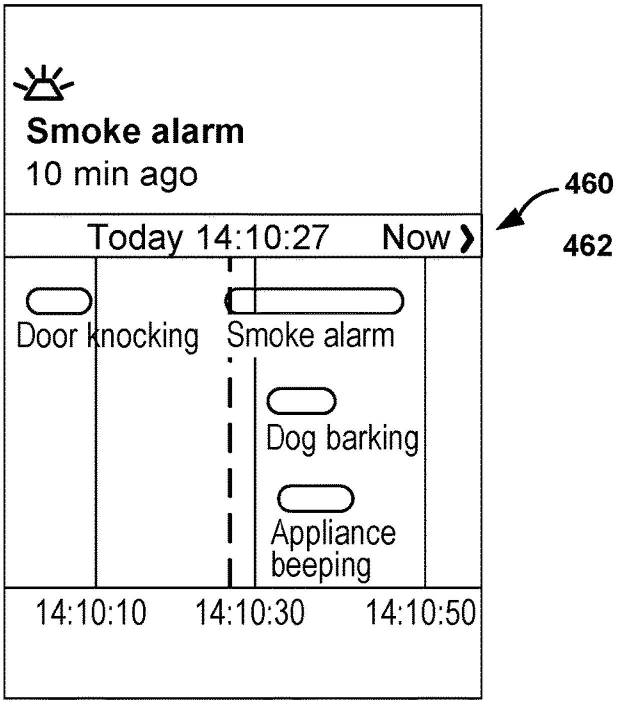
FIGS. 4A and 4B are conceptual diagrams illustrating example graphical user interfaces (GUIs) that may be output by a computing device that generates structured sound records, in accordance with one or more techniques of this disclosure.
Figure 4B:
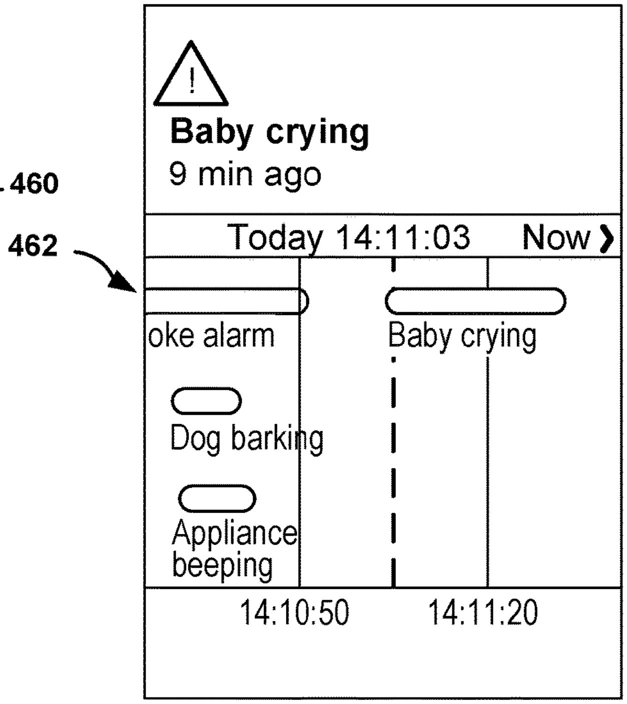

FIGS. 4A and 4B are conceptual diagrams illustrating example graphical user interfaces (GUIs) that may be output by a computing device that generates structured sound records, in accordance with one or more techniques of this disclosure. As discussed above, a computing device may generate non-audio output based on the generated structured sound records. In some examples, it may be difficult for a DHH person to gain knowledge about sounds based purely on sound labeling and/or text transcriptions.

In accordance with one or more techniques of this disclosure, a computing device, such as computing device 102 of FIG. 1, may output a non-audio indication of one or more structured sound records as a graphical user interface that includes a timeline representation of the one or more structured sound records. The timeline representation may graphically indicate a sequence in which sounds of the one or more structured sound records occurred. For instance, as shown in FIG. 4A, timeline representation in GUI 460 indicates that a door knocking sound occurred prior to a smoke alarm sound, the smoke alarm sound occurred prior to a dog barking sound, and the dog barking sound occurred prior to an appliance beeping sound. As can also be seen in the example of FIG. 4A, the timeline representation may include a horizontal axis representing time. In other examples, the representation may be rotated such that time is represented on a vertical axis. The representation of the structured sound records in the graphical timeline representation may include an indication of their descriptive label (e.g., in text form) and may also include an indication of a category of their descriptive label (e.g., color coded, such as: emergency category being red, priority being yellow, and other being green).

A user may interact with the graphical timeline representation in a variety of ways. As one example, as shown in the example of FIG. 4A, a particular representation of a structured sound record may be selected (e.g., by a user tapping on the representation), and further information about a selected structured sound record may be displayed (e.g., how long ago the structured sound record was generated). As another example, a user may provide user input to scroll forwards or backwards in time. For instance, responsive to receiving user input to scroll forwards in time while displaying GUI 460, a computing device may display GUI 462 which is a view of the same graphical timeline representation, but at a later time than shown in GUI 460.

In some examples, a first computing device, such as computing device 102 of FIG. 1, may output a representation structured sound records to a second computing device, such as computing device 114 of FIG. 1, so as to enable the second computing device to output a timeline representation of the structured sound records. In some examples, the representation of the structured sound records may be a copy of the structured sound records. In other examples, the representation of the structured sound records may include a subset of data that is included in the original structured sound records. By enabling the second computing device to output a timeline representation, the two computing devices may view timeline representations of a same set of structured sound records. For instance, the first computing device may view a timeline representation that includes structured sound records of a set of structured sound records in a first window of time and the second computing device may view a timeline representation that includes structured sound records of the set of structured sound records in a second window of time (e.g., which may be same as, or may be different than, the first window of time). As such, the first computing device may output a first graphical user interface including a current timeline representation of one or more structured sound records, and the second computing device may output a second graphical user interface including a past timeline representation of the one or more structured sound records.

Computing devices may output timeline representations for structured sound records that include descriptive labels (e.g., that do not include text transcriptions), time line representations for structured sound records that include text transcriptions, and hybrid timeline representations that include both structured sound records that include descriptive labels and structured sound records that include text transcriptions. Combining timeline representations and the ability to enable a second computing device to output a timeline representation of the structured sound records may assist with a variety of use cases.

As one example, where a first user and a second user are both attending a same event (e.g., concert, performance, speech, talk, etc.) and the first user is seated in a better audio vantage point (e.g., closer to a stage or speakers), a first computing device used by the first user may generate structured sound records and output said structured sound records to a second computing device used by the second user. As the second user has a worse audio vantage point than the first user, this may enable the second user to view a timeline representation (e.g., that may include text transcriptions of the event) that is more accurate than a timeline representation that would have been generated by the second computing device (e.g., based on audio data generated by microphones of the second computing device). In some examples, such as where a hybrid timeline view is used, the timeline representations may include tagged sounds (e.g., applause) and may show how an audience reacted to performance (how often they applauded, how long, how loudly etc.).

As another example, where a single user is using a first computing device and a second computing device, the first computing device may generate structured sound records and output said structured sound records to the second computing device. The user may then scroll back in time using the second computing device while still occasionally glancing at the timeline representation on the first computing device, which may be periodically updated with new structured sound records as they are generated.

In some examples, such as where a timeline view includes text transcriptions, the timeline view may further include representations of emotional characteristics of the text transcriptions. For instance, a computing device may output an indication that corresponds to an emotional characteristic proximal to a text transcription of a structured sound record having the emotional characteristic (e.g., display a sad face emoji near text transcribed from speech said in a sad voice).

While described above in the context of benefiting users who are DHH, the techniques of this disclosure are not so limited. For instance, the techniques of this disclosure can be useful for people who hear. As one example, parents can return to home and quickly check what sound events occurred at home during their absence.

Figure 5A:
FIGS. 5A and 5B are conceptual diagrams illustrating example graphical user interfaces (GUIs) that may be output by a computing device that generates structured sound records, in accordance with one or more techniques of this disclosure.
Figure 5B:
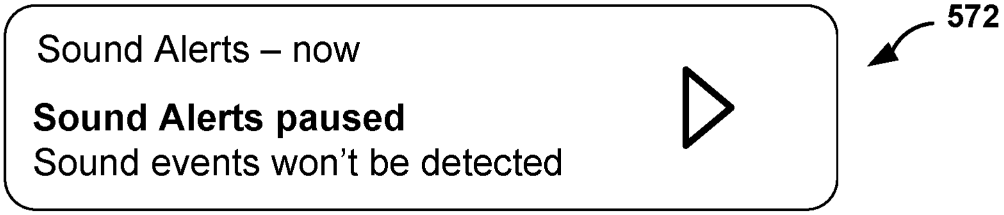

FIGS. 5A and 5B are conceptual diagrams illustrating example graphical user interfaces (GUIs) that may be output by a computing device that generates structured sound records, in accordance with one or more techniques of this disclosure. As discussed above, a computing device may monitor audio data generated by one or more microphones of the computing device to selectively generate structured audio records. A user of the computing device is presented with controls to enable the user to selectively enable and disable such monitoring of audio data. For instance, when the computing device is actively monitoring audio data, the computing device may output GUI 570 that includes both an indication that the monitoring is active and a control (e.g., a pause button) to give the user control to disable the monitoring. Responsive to the user providing user input to disable the monitoring (e.g., tapping the pause button), the computing device may output GUI 572 that includes both an indication that the monitoring is not active and a control (e.g., a play button) to give the user control to enable the monitoring. The computing device may not monitor the audio data without receiving prior consent from the user.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIGS. 6A through 6E are conceptual diagrams illustrating aspects of an example machine-learned model according to example implementations of the present disclosure. FIGS. 6A through 6E are described below in the context of a model or models used by structured sound module 110 of FIG. 1. For example, in some instances, machine-learned model 300, as referenced below, may be an example of a model or models used by structured sound module 110 of FIG. 1.

Figure 6A:
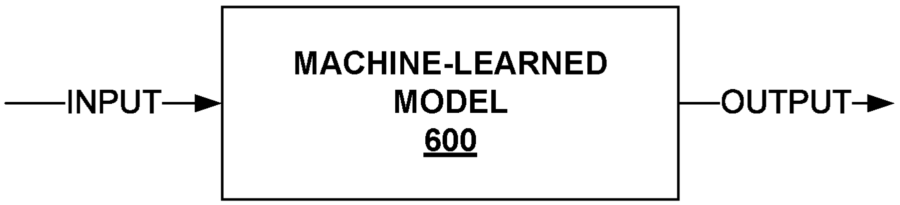
FIGS. 6A through 6E are conceptual diagrams illustrating aspects of an example machine-learned model according to example implementations of the present disclosure.

FIG. 6A depicts a conceptual diagram of an example machine-learned model according to example implementations of the present disclosure. As illustrated in FIG. 6A, in some implementations, machine-learned model 600 is trained to receive input data of one or more types and, in response, provide output data of one or more types. Thus, FIG. 6A illustrates machine-learned model 600 performing inference.

The input data may include one or more features that are associated with an instance or an example. In some implementations, the one or more features associated with the instance or example can be organized into a feature vector. In some implementations, the output data can include one or more predictions. Predictions can also be referred to as inferences. Thus, given features associated with a particular instance, machine-learned model 600 can output a prediction for such instance based on the features.

Machine-learned model 600 can be or include one or more of various different types of machine-learned models. In particular, in some implementations, machine-learned model 600 can perform classification, regression, clustering, anomaly detection, recommendation generation, and/or other tasks.

In some implementations, machine-learned model 600 can perform various types of classification based on the input data. For example, machine-learned model 600 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 600 may perform discrete categorical classification in which the input data is simply classified into one or more classes or categories.

In some implementations, machine-learned model 600 can perform classification in which machine-learned model 600 provides, for each of one or more classes, a numerical value descriptive of a degree to which it is believed that the input data should be classified into the corresponding class. In some instances, the numerical values provided by machine-learned model 600 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 600 may output a probabilistic classification. For example, machine-learned model 600 may predict, given a sample input, a probability distribution over a set of classes. Thus, rather than outputting only the most likely class to which the sample input should belong, machine-learned model 600 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 600 performs classification (e.g., of sounds), machine-learned model 600 may be trained using supervised learning techniques. For example, machine-learned model 600 may be trained on a training dataset that includes training examples labeled as belonging (or not belonging) to one or more classes (e.g., one or more pre-determined descriptive labels). Further details regarding supervised training techniques are provided below in the descriptions of FIGS. 6B through 6E.

In some implementations, machine-learned model 600 can perform regression to provide output data in the form of a continuous numeric value. The continuous numeric value can correspond to any number of different metrics or numeric representations, including, for example, currency values, scores, or other numeric representations. As examples, machine-learned model 600 can perform linear regression, polynomial regression, or nonlinear regression. As examples, machine-learned model 600 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 600 may perform various types of clustering. For example, machine-learned model 600 can identify one or more previously-defined clusters to which the input data most likely corresponds. Machine-learned model 600 may identify one or more clusters within the input data. That is, in instances in which the input data includes multiple objects, documents, or other entities, machine-learned model 600 can sort the multiple entities included in the input data into a number of clusters. In some implementations in which machine-learned model 600 performs clustering, machine-learned model 600 can be trained using unsupervised learning techniques.

Machine-learned model 600 may perform anomaly detection or outlier detection. For example, machine-learned model 600 can identify input data that does not conform to an expected pattern or other characteristic (e.g., as previously observed from previous input data). As examples, the anomaly detection can be used for fraud detection or system failure detection.

Machine-learned model 600 may, in some cases, act as an agent within an environment. For example, machine-learned model 600 can be trained using reinforcement learning, which will be discussed in further detail below.

In some implementations, machine-learned model 600 can be a parametric model while, in other implementations, machine-learned model 600 can be a non-parametric model. In some implementations, machine-learned model 600 can be a linear model while, in other implementations, machine-learned model 600 can be a non-linear model.

As described above, machine-learned model 600 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 600 can be or include one or more classifier models such as, for example, linear classification models; quadratic classification models; etc. Machine-learned model 600 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 600 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 600 may be or include one or more kernel machines. In some implementations, machine-learned model 600 can be or include one or more support vector machines. Machine-learned model 600 may be or include one or more instance-based learning models such as, for example, learning vector quantization models; self-organizing map models; locally weighted learning models; etc. In some implementations, machine-learned model 600 can be or include one or more nearest neighbor models such as, for example, k-nearest neighbor classifications models; k-nearest neighbors regression models; etc. Machine-learned model 600 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 600 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 600 can be or include one or more feed forward neural networks. In feed forward networks, the connections between nodes do not form a cycle. For example, each connection can connect a node from an earlier layer to a node from a later layer.

In some instances, machine-learned model 600 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 600 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 600 can be or include one or more generative networks such as, for example, generative adversarial networks. Generative networks can be used to generate new data such as new images or other content.

Machine-learned model 600 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 600 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 600 may include one or more clustering models such as, for example, k-means clustering models; k-medians clustering models; expectation maximization models; hierarchical clustering models; etc.

In some implementations, machine-learned model 600 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 600 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 600 can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

In some implementations, machine-learned model 600 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 600 can be used to preprocess the input data for subsequent input into another model. For example, machine-learned model 600 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 600 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 600 can receive and use the input data in its raw form. In some implementations, the raw input data can be preprocessed. Thus, in addition or alternatively to the raw input data, machine-learned model 600 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 600. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 600 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to suggest content, either stored locally on the uses device or in the cloud, that is relevantly shareable along with the initial content selection based on features of the initial content selection. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 6B:
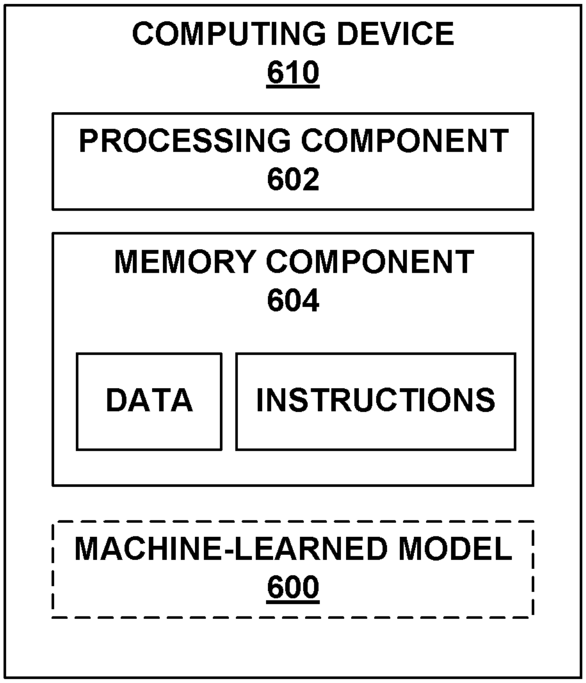

FIG. 6B illustrates a conceptual diagram of computing device 610, which is an example of computing device 102 of FIG. 1. Computing device 610 includes processing component 602, memory component 604 and machine-learned model 600. Computing device 610 may store and implement machine-learned model 600 locally (i.e., on-device). Thus, in some implementations, machine-learned model 600 can be stored at and/or implemented locally by an embedded device or a user computing device such as a mobile device. Output data obtained through local implementation of machine-learned model 600 at the embedded device or the user computing device can be used to improve performance of the embedded device or the user computing device (e.g., an application implemented by the embedded device or the user computing device).

Figure 6C:
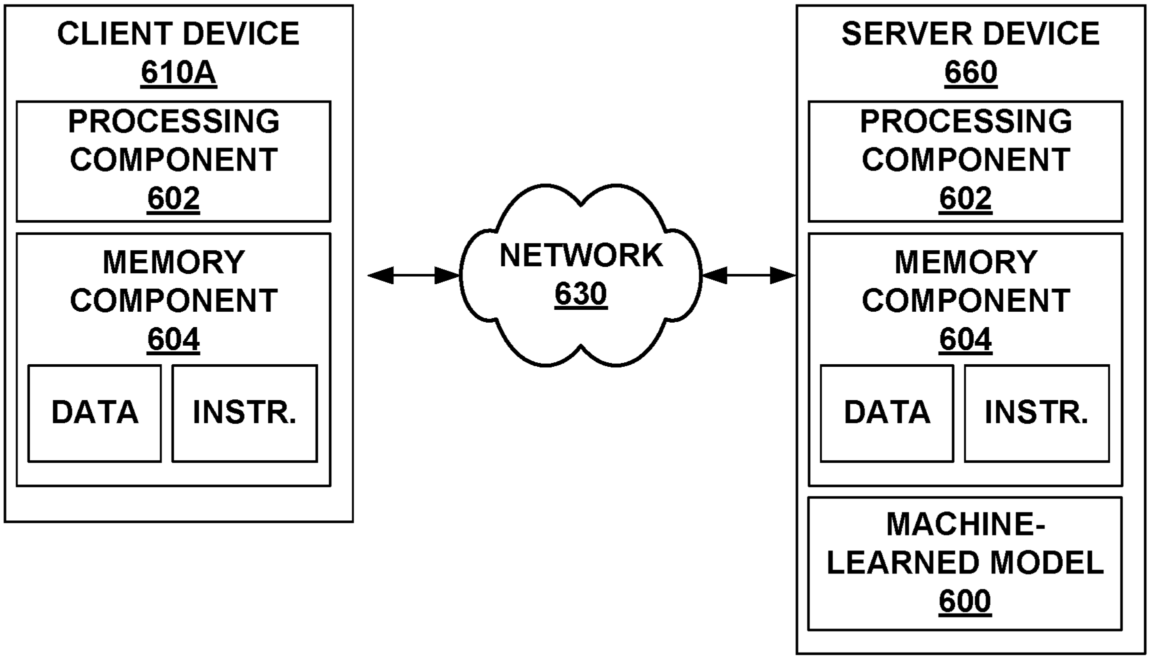

FIG. 6C illustrates a conceptual diagram of an example client computing device that can communicate over a network with an example server computing system that includes a machine-learned model. FIG. 6C includes client device 610A communicating with server device 660 over network 630. Client device 610A is an example of computing device 102 of FIG. 1. Server device 660 stores and implements machine-learned model 600. In some instances, output data obtained through machine-learned model 600 at server device 660 can be used to improve other server tasks or can be used by other non-user devices to improve services performed by or for such other non-user devices. For example, the output data can improve other downstream processes performed by server device 660 for a computing device of a user or embedded computing device. In other instances, output data obtained through implementation of machine-learned model 600 at server device 660 can be sent to and used by a user computing device, an embedded computing device, or some other client device, such as client device 610A. For example, server device 660 can be said to perform machine learning as a service.

In yet other implementations, different respective portions of machine-learned model 600 can be stored at and/or implemented by some combination of a user computing device; an embedded computing device; a server computing device; etc. In other words, portions of machine-learned model 600 may be distributed in whole or in part amongst client device 610A and server device 660.

Devices 610A and 660 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 610A and 660 may be distributed at different physical locations and connected via one or more networks, including network 630. If configured as distributed computing devices, Devices 610A and 660 may operate according to sequential computing architectures, parallel computing architectures, or combinations thereof. In one example, distributed computing devices can be controlled or guided through use of a parameter server.

In some implementations, multiple instances of machine-learned model 600 can be parallelized to provide increased processing throughput. For example, the multiple instances of machine-learned model 600 can be parallelized on a single processing device or computing device or parallelized across multiple processing devices or computing devices.

Each computing device that implements machine-learned model 600 or other aspects of the present disclosure can include a number of hardware components that enable performance of the techniques described herein. For example, each computing device can include one or more memory devices that store some or all of machine-learned model 600. For example, machine-learned model 600 can be a structured numerical representation that is stored in memory. The one or more memory devices can also include instructions for implementing machine-learned model 600 or performing other operations. Example memory devices include RAM, ROM, EEPROM, EPROM, flash memory devices, magnetic disks, etc., and combinations thereof.

Each computing device can also include one or more processing devices that implement some or all of machine-learned model 600 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 6D:
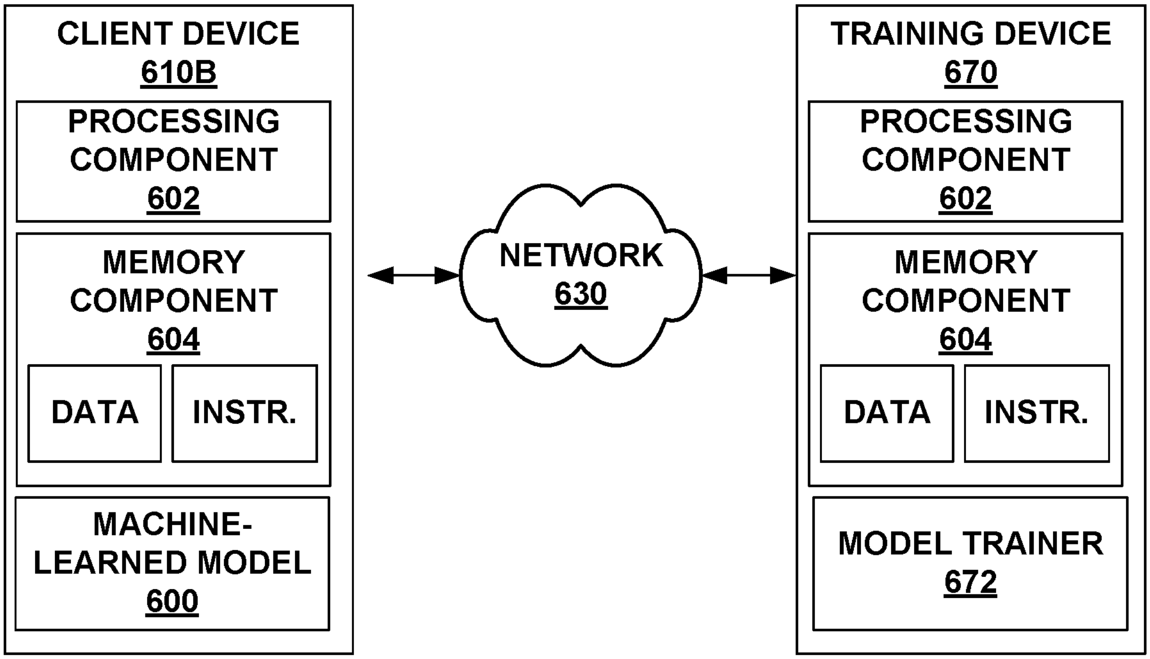

FIG. 6D illustrates a conceptual diagram of an example computing device in communication with an example training computing system that includes a model trainer. FIG. 6D includes client device 610B communicating with training device 670 over network 630. Client device 610B is an example of computing device 102 of FIG. 1. Machine-learned model 600 described herein can be trained at a training computing system, such as training device 670, and then provided for storage and/or implementation at one or more computing devices, such as client device 610B. For example, model trainer 672 executes locally at training device 670. However, in some examples, training device 670, including model trainer 672, can be included in or separate from client device 610B or any other computing device that implements machine-learned model 600.

In some implementations, machine-learned model 600 may be trained in an offline fashion or an online fashion. In offline training (also known as batch learning), machine-learned model 600 is trained on the entirety of a static set of training data. In online learning, machine-learned model 600 is continuously trained (or re-trained) as new training data becomes available (e.g., while the model is used to perform inference).

Model trainer 672 may perform centralized training of machine-learned model 600 (e.g., based on a centrally stored dataset). In other implementations, decentralized training techniques such as distributed training, federated learning, or the like can be used to train, update, or personalize machine-learned model 600.

Machine-learned model 600 described herein can be trained according to one or more of various different training types or techniques. For example, in some implementations, machine-learned model 600 can be trained by model trainer 672 using supervised learning, in which machine-learned model 600 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 6E:
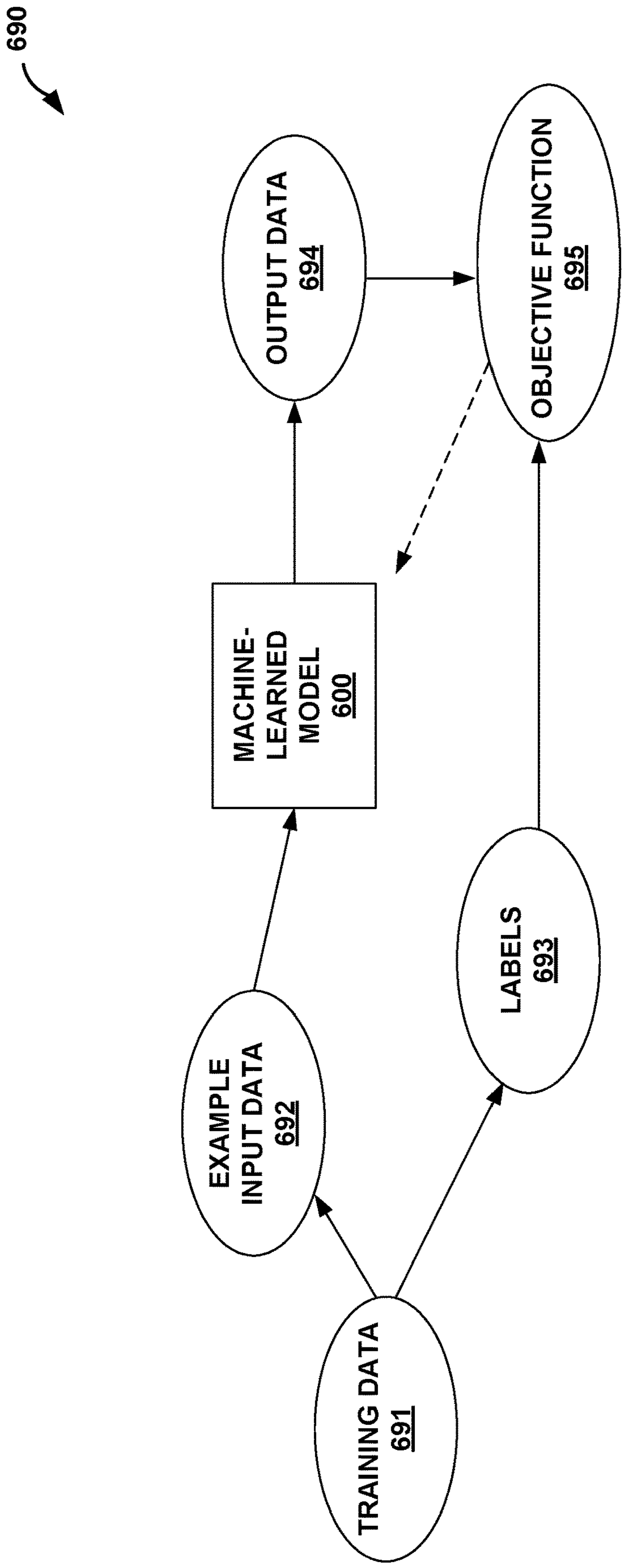

FIG. 6E illustrates a conceptual diagram of training process 690 which is an example training process in which machine-learned model 600 is trained on training data 391 that includes example input data 692 that has labels 693. Training processes 690 is one example training process; other training processes may be used as well.

Training data 691 used by training process 690 can include, upon user permission for use of such data for training, anonymized usage logs of sharing flows, e.g., content items that were shared together, bundled content pieces already identified as belonging together, e.g., from entities in a knowledge graph, etc. In some implementations, training data 691 can include examples of input data 692 that have been assigned labels 693 that correspond to output data 694.

In some implementations, machine-learned model 600 can be trained by optimizing an objective function, such as objective function 695. For example, in some implementations, objective function 695 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 695 may be or include a cost function that describes a cost of a certain outcome or output data. Other examples of objective function 695 can include margin-based techniques such as, for example, triplet loss or maximum-margin training.

One or more of various optimization techniques can be performed to optimize objective function 695. For example, the optimization technique(s) can minimize or maximize objective function 695. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 600 (e.g., when machine-learned model is a multi-layer model such as an artificial neural network). For example, an iterative cycle of propagation and model parameter (e.g., weights) update can be performed to train machine-learned model 600. Example backpropagation techniques include truncated backpropagation through time, Levenberg-Marquardt backpropagation, etc.

In some implementations, machine-learned model 600 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 600 can be trained using semi-supervised techniques which combine aspects of supervised learning and unsupervised learning. Machine-learned model 600 can be trained or otherwise generated through evolutionary techniques or genetic algorithms. In some implementations, machine-learned model 600 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor sub-optimal actions explicitly corrected.

In some implementations, one or more generalization techniques can be performed during training to improve the generalization of machine-learned model 600. Generalization techniques can help reduce overfitting of machine-learned model 600 to the training data. Example generalization techniques include dropout techniques; weight decay techniques; batch normalization; early stopping; subset selection; stepwise selection; etc.

In some implementations, machine-learned model 600 described herein can include or otherwise be impacted by a number of hyperparameters, such as, for example, learning rate, number of layers, number of nodes in each layer, number of leaves in a tree, number of clusters; etc. Hyperparameters can affect model performance.

Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 600 described herein.

In some implementations, machine-learned model 600 described herein can be included in different portions of computer-readable code on a computing device. In one example, machine-learned model 600 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 600 described herein can be included in an operating system of a computing device (e.g., in a central intelligence layer of an operating system) and can be called or otherwise used by one or more applications that interact with the operating system. In some implementations, each application can communicate with the central intelligence layer (and model (s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning a Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 7:
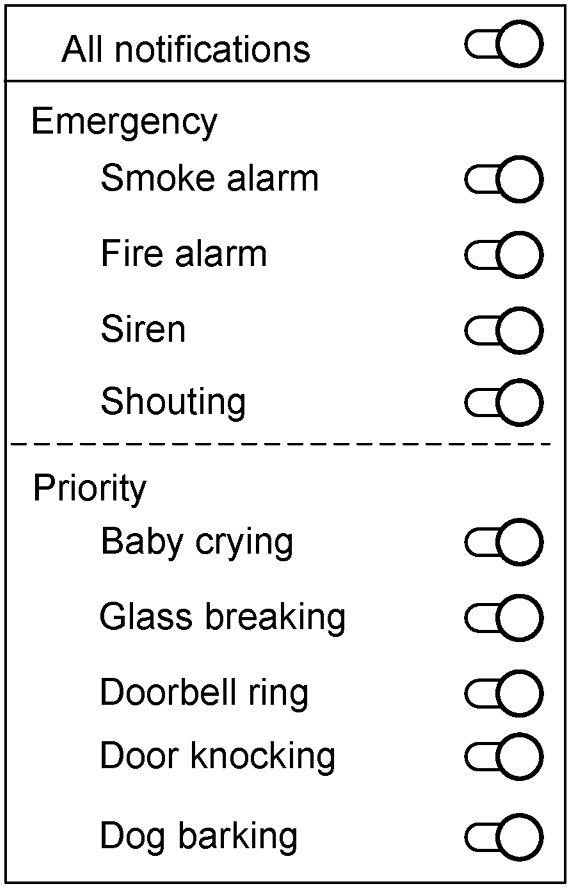
FIG. 7 is a conceptual diagram illustrating an example graphical user interface (GUI) that may be output by a computing device that generates structured sound records, in accordance with one or more techniques of this disclosure.

FIG. 7 is a conceptual diagram illustrating an example graphical user interface (GUI) that may be output by a computing device that generates structured sound records, in accordance with one or more techniques of this disclosure. As shown in FIG. 7, a computing device, such as computing device 102 of FIG. 1, may output a GUI with options for a user to enable or disable the outputting of a non-audio indication in response to the generation of structured audio records with various labels. For instance, a user may separately and selectively cause the computing device to output, or not output, a non-audio indication in response to the generation of structured audio records with smoke alarm labels, fire alarm labels, siren labels, shouting labels, baby crying labels, glass breaking labels, doorbell ringing labels, door knocking labels, and dog barking labels.

Figure 8:
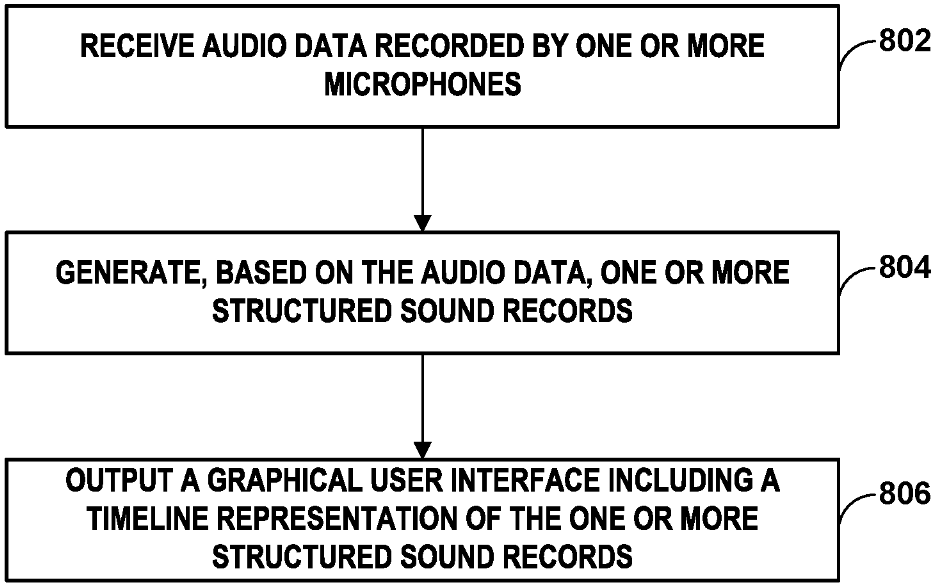
FIG. 8 is a flowchart illustrating an example technique for displaying a timeline representation of structured sound records, in accordance with one or more techniques of this disclosure.

FIG. 8 is a flowchart illustrating an example technique for displaying a timeline representation of structured sound records, in accordance with one or more techniques of this disclosure. Although described with reference to computing device 102 of FIG. 1 and/or computing device 202 of FIG. 2, the operations of FIG. 8 may be performed by components of any suitable computing device.

A computing device may receive audio data recorded by one or more microphones of the computing device (802). For instance, one or more of microphones 106 of computing device 102 may generate electrical signals representative of sounds. Processors 108 of computing device 102 may receive a representation of the electrical signals.

The computing device may generate, based on the audio data and by the one or more processors, one or more structured sound records (804). For instance, processors 108 may process the audio data to generate the structured sound records. The structured sound records may include one or more parameters. For instance, each respective structured sound record of the structured sound records may include a respective description and a respective time stamp. As such, a first structured sound record of the one or more structured sound records may include a description of a first sound, the description including a descriptive label of the first sound, the descriptive label different than a text transcription of the first sound, and a time stamp indicating a time at which the first sound occurred.

The computing device may output a graphical user interface including a timeline representation of the one or more structured sound records (806). For instance, computing device 102 may output a graphical user interface similar to GUI 460 of FIG. 4A or GUI 462 of FIG. 4B. In some examples, computing device 102 may locally output the graphical user interface (e.g., at a display of the computing device). In some examples, computing device 102 may cause another computing device to output the graphical user interface. For instance, computing device 202 may cause computing device 214 to output the graphical user interface that includes the timeline representation. In some examples, computing device 102 may both locally output the timeline representation and cause the other computing device to output the timeline representation.

In some examples, the computing device may provide indications of viewing of the timeline representation. For instance, responsive to receiving, at computing device 202, user input indicating viewing of the timeline representation at a particular time, computing device 202 may modify output of the timeline representation at computing device 214 to indicate previous viewing. The user input indicating viewing may include, but is not necessarily limited to, touch input (e.g., tapping, swiping, etc.) proximate to a portion of a display of computing device 202 at which the timeline representation is displayed, verbal input, etc. To modify output of the timeline representation, computing device 202 may output a signal to computing device 214 indicating that the timeline representation has been viewed. Responsive to receiving said signal, computing device 214 may dismiss or otherwise modify output of the timeline representation at computing device 214.

As one illustrative example, after computing device 202 displays a timeline representation of one or more structured sound records (e.g., indicating that a baby is crying), a first child caregiver may provide user input to computing device 202 indicating viewing of the timeline representation. As the first caregiver already viewed the timeline representation, it may no longer be as urgent for a second caregiver (e.g., a user of computing device 214) to view the timeline representation. As such, responsive to receiving a signal indicating that the timeline representation has been viewed, computing device 214 may dismiss or otherwise modify output of the timeline representation at computing device 214.

The following numbered examples may illustrate one or more aspects of the disclosure:

Example 1A. A method comprising: receiving, by one or more processors of a computing device, audio data recorded by one or more microphones of the computing device; generating, based on the audio data and by the one or more processors, one or more structured sound records, a first structured sound record of the one or more structured sound records including: a description of a first sound, the description including a descriptive label of the first sound, the descriptive label different than a text transcription of the first sound, and a time stamp indicating a time at which the first sound occurred; and outputting a non-audio indication of the one or more structured sound records.

Example 2A. The method of example 1A, wherein outputting the non-audio indication comprises outputting a graphical user interface including a timeline representation of the one or more structured sound records.

Example 3A. The method of example 2A, wherein the timeline representation indicates a sequence in which sounds of the one or more structured sound records occurred.

Example 4A. The method of example 2A or example 3A, wherein a second structured sound record of the one or more sound records includes: a description of a second sound, the description including a text transcription of the second sound, and a time stamp indicating a time at which the second sound occurred.

Example 5A. The method of any of examples 2A-4A, wherein outputting the graphical user interface comprises outputting a first graphical user interface including a current timeline representation of the one or more structured sound records, the method further comprising: outputting a second graphical user interface including a past timeline representation of the one or more structured sound records.

Example 6A. The method of example 5A, wherein outputting the first graphical user interface comprises outputting the first graphical user interface for display at a first display, and wherein outputting the second graphical user interface comprises outputting the second graphical user interface for display at a second display that is different than the first display.

Example 7A. The method of any of examples 1A-6A, wherein outputting the non-audio indication comprises outputting the non-audio indication in response to determining that a newly generated sound record of the one or more structured sound records has a descriptive label included in a pre-determined set of descriptive labels.

Example 8A. The method of example 7A, wherein the pre-determined set of descriptive labels includes emergency category labels, priority category labels, and other category labels.

Example 9A. The method of example 8A, wherein the emergency category labels include one or more of a smoke alarm label, a fire alarm label, a carbon monoxide label, a siren label, and a shouting label.

Example 10A. The method of example 8A or 9A, wherein the priority category labels include one or more of a baby crying label, a doorbell label, a door knocking label, an animal alerting label, and a glass breaking label.

Example 11A. The method of any of examples 8A-10A, wherein the other category labels include one or more of a water running label, a landline phone ringing label, and one or more appliance beep labels.

Example 12A. The method of any of examples 8A-11A, wherein outputting the non-audio indication comprises: selecting, based on a category of the descriptive label of the particular structured sound record, an output modality for the non-audio indication.

Example 13A. The method of example 12A, wherein selecting the output modality comprises selecting one or more of haptic outputs, graphical outputs, and light outputs as the non-audio indication of the one or more structured sound records.

Example 14A. The method of any of examples 7A-13A, wherein outputting the non-audio indication of the newly generated sound record comprises outputting the non-audio indication at the computing device.

Example 15A. The method of any of examples 7A-13A, wherein the computing device is a first computing device, wherein outputting the non-audio indication of the newly generated sound record comprises causing a second computing device to output the non-audio indication, and wherein the second computing device is different than the first computing device.

Example 16A. The method of any of examples 7A-13A, wherein the computing device is a first computing device, wherein outputting the non-audio indication of the newly generated sound record comprises: outputting the non-audio indication at the first computing device; and causing a second computing device to output the non-audio indication, and wherein the second computing device is different than the first computing device.

Example 17A. The method of example 15A or example 16A, wherein the second computing device comprises a wearable computing device.

Example 18A. The method of example 16A or example 17A, wherein outputting the non-audio indication of the newly generated sound record further comprises: causing a third computing device to output the non-audio indication, and wherein the third computing device is different than the second computing device and is different than the first computing device.

Example 19A. The method of any of examples 1A-18A, wherein generating a structured record of the one or more structured sound records comprises: determining, using a machine learning model, a descriptive label for the structured sound record.

Example 20A. The method of any of examples 1A-19A, wherein the one or more microphones of the mobile computing device include one or more of: one or more microphones included in the mobile computing device, and/or one or more external microphones connected to the mobile computing device via a wired or wireless connection.

Example 21A. The method of any of examples 1A-20A, wherein outputting the non-audio indication comprises outputting a haptic indication of the first structured sound record of the one or more structured sound records.

Example 22A. The method of example 21A, wherein outputting the haptic indication of the first structured sound record comprises: selecting, based on the descriptive label of the first structured sound record, a first haptic pattern of a plurality of haptic patterns; and causing a haptic output device to output the first haptic pattern.

Example 23A. The method of example 22A, further comprising: outputting a haptic indication of a second structured sound record by at least: selecting, based on the descriptive label of the second structured sound record, a second haptic pattern of the plurality of haptic patterns, the second haptic pattern being different than the first haptic pattern; and causing the haptic output device to output the second haptic pattern.

Example 24A. The method of examples 23A, wherein the descriptive label of the first structured sound record is in an emergency category label, wherein the descriptive label of the second structured sound record is not an emergency category label, and wherein an average amplitude of the first haptic pattern is greater than an average amplitude of the second haptic pattern.

Example 25A. The method of examples 21A, wherein outputting the haptic indication of the first structured sound record comprises: outputting, at a first time, a first haptic indication that represents a start of the first sound; and outputting, at a second time that is after the first time, a second haptic indication that represents an end of the first sound.

Example 26A. The method of any of examples 1A-25A, wherein outputting the non-audio indication of the one or more structured sound records comprises outputting, via one or devices implanted in a brain of a user, a signal.

Example 27A. The method of any of examples 1A-26A, wherein outputting a non-audio indication of the first structured sound record of the one or more structured sound records includes outputting a representation of an amplitude of the first sound.

Example 28A. A method comprising: receiving, by one or more processors of a first computing device, audio data recorded by one or more microphones of the first computing device; generating, based on the audio data and by the one or more processors, one or more structured sound records, a first structured sound record of the one or more structured sound records including: a description of a first sound, the description including a text transcription of the first sound, and a time stamp indicating a time at which the first sound occurred; outputting, at the first computing device, a non-audio indication of the one or more structured sound records including the text transcription of the first sound; and outputting, by the first computing device and to be received by a second computing device being used by a user at a same event as a user of the first computing device, a representation of the one or more structured sound records including the text transcription of the first sound.

Example 29A. The method of example 28A, wherein generating a structured record of the one or more structured sound records comprises: determining, using a machine learning model, the text transcription of the first sound.

Example 30A. The method of example 28A or 29A, wherein the one or more microphones of the mobile computing device include one or more of: one or more microphones included in the mobile computing device, and/or one or more external microphones connected to the mobile computing device via a wired or wireless connection.

Example 31A. A computing device comprising: one or more microphones; and one or more processors configured to perform the method of any combination of examples 1A-30A.

Example 32A. A computer-readable storage medium storing instructions that, when executed, cause one or more processors of a computing device to perform the method of any combination of examples 1A-30A.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:

receiving, by one or more processors of a computing device, audio data recorded by one or more microphones of the computing device; and generating, based on the audio data and by the one or more processors, one or more structured sound records, a first structured sound record of the one or more structured sound records including:

a description of a first sound, the description including a descriptive label of the first sound, the descriptive label representing a classification of a non-speech environmental sound and being different than a text transcription of the first sound, and a time stamp indicating a time at which the first sound occurred; and outputting a graphical user interface including a timeline representation of the one or more structured sound records, wherein the timeline representation visually indicates a sequence of a plurality of structured sound records corresponding to a plurality of different classified non-speech environmental sounds.

2. The method of claim 1, wherein the timeline representation indicates a sequence in which sounds of the one or more structured sound records occurred.

3. The method of claim 1, wherein a second structured sound record of the one or more sound records includes:

a description of a second sound, the description including a text transcription of the second sound, and a time stamp indicating a time at which the second sound occurred.

4. The method of claim 1, wherein outputting the graphical user interface comprises outputting a first graphical user interface including a current timeline representation of the one or more structured sound records, the method further comprising:

outputting a second graphical user interface including a past timeline representation of the one or more structured sound records.

5. The method of claim 4, wherein outputting the first graphical user interface comprises outputting the first graphical user interface for display at a first display, and wherein outputting the second graphical user interface comprises outputting the second graphical user interface at a second display that is included in a device that is different than a device that includes the first display.

6. The method of claim 1, wherein outputting the graphical user interface comprises outputting the graphical user interface in response to determining that a newly generated sound record of the one or more structured sound records has a descriptive label included in a pre-determined set of descriptive labels.

7. The method of claim 6, wherein the pre-determined set of descriptive labels includes emergency category labels, priority category labels, and other category labels.

8. The method of claim 7, wherein:

the emergency category labels include one or more of a smoke alarm label, a fire alarm label, a carbon monoxide label, a siren label, and a shouting label;

the priority category labels include one or more of a baby crying label, a doorbell label, a door knocking label, an animal alerting label, and a glass breaking label; and the other category labels include one or more of a water running label, a landline phone ringing label, and one or more appliance beep labels.

9. The method of claim 1, wherein outputting the graphical user interface including the timeline representation comprises outputting the graphical user interface including the timeline representation at a display of the computing device.

10. The method of claim 1, wherein the computing device is a first computing device, wherein outputting the graphical user interface including the timeline representation comprises causing a second computing device to output, at a display of the second computing device, the graphical user interface including the timeline representation, and wherein the second computing device is different than the first computing device.

11. The method of claim 10, further comprising:

responsive to receiving, at the computing device, user input indicating viewing of the timeline representation at a particular time, modifying output of the timeline representation at the second computing device to indicate previous viewing.

12. The method of claim 10, wherein the second computing device comprises a wearable computing device.

13. The method of claim 10, wherein the first computing device does not include a display.

14. The method of claim 1, further comprising: determining that the classification of the non-speech environmental sound corresponds to an emergency category; and outputting, concurrently with the graphical user interface, a non-audio alert via at least one of a haptic output device or a light device of the computing device.

15. The method of claim 1, further comprising: transmitting a signal to a wearable computing device communicatively coupled to the computing device, wherein the signal causes the wearable computing device to output a haptic alert corresponding to the classification of the non-speech environmental sound.

16. The method of claim 1, further comprising: receiving user input to scroll the timeline representation backwards in time; and updating the graphical user interface to display a past timeline representation indicating a sequence of previously generated structured sound records corresponding to previously classified non-speech environmental sounds.

17. The method of claim 1, wherein the timeline representation further includes a graphical plot indicating an amplitude of the first sound over a duration of the first sound.

18. A computing device comprising:

one or more microphones configured to record audio data; and one or more processors configured to:

generate, based on the audio data, one or more structured sound records, a first structured sound record of the one or more structured sound records including:

a description of a first sound, the description including a descriptive label of the first sound, the descriptive label representing a classification of a non-speech environmental sound and being different than a text transcription of the first sound, and a time stamp indicating a time at which the first sound occurred; and output a graphical user interface including a timeline representation of the one or more structured sound records, wherein the timeline representation visually indicates a sequence of a plurality of structured sound records corresponding to a plurality of different classified non-speech environmental sounds.

19. The computing device of claim 18, wherein the timeline representation indicates a sequence in which sounds of the one or more structured sound records occurred.

20. The computing device of claim 18, wherein a second structured sound record of the one or more sound records includes:

a description of a second sound, the description including a text transcription of the second sound, and a time stamp indicating a time at which the second sound occurred.

21. The computing device of claim 18, wherein, to output the graphical user interface, the one or more processors are configured to output a first graphical user interface including a current timeline representation of the one or more structured sound records, and wherein the one or more processors are further configured to:

output a second graphical user interface including a past timeline representation of the one or more structured sound records.

22. The computing device of claim 18, wherein outputting the graphical user interface including the timeline representation comprises causing another computing device to output the graphical user interface including the timeline representation, and wherein the other computing device is different than the computing device.

23. The computing device of claim 22, wherein the one or more processors are further configured to:

modify, responsive to receiving user input indicating viewing of the timeline representation at a particular time, output of the timeline representation at the other computing device to indicate previous viewing.

24. A computer-readable storage medium storing instructions that, when executed, cause one or more processors of a computing device to:

receive audio data recorded by one or more microphones of the computing device;

generate, based on the audio data, one or more structured sound records, a first structured sound record of the one or more structured sound records including:

a description of a first sound, the description including a descriptive label of the first sound, the descriptive label representing a classification of a non-speech environmental sound and being different than a text transcription of the first sound, and a time stamp indicating a time at which the first sound occurred; and output a graphical user interface including a timeline representation of the one or more structured sound records, wherein the timeline representation visually indicates a sequence of a plurality of structured sound records corresponding to a plurality of different classified non-speech environmental sounds.

* * * * *